(12) United States Patent
Takahashi et al.

(10) Patent No.: US 6,308,433 B1
(45) Date of Patent: Oct. 30, 2001

(54) MICROMETER THAT HOLDS DISPLAYED DISPLACEMENT WHEN RETRACTION AMOUNT IS LESS THAN A SET AMOUNT

(75) Inventors: Seigo Takahashi, Kawasaki; Tetsuya Nakadoi, Higashihiroshima; Takahiro Otsuka, Kawasaki; Shuuji Hayashida, Kawasaki; Kouji Sasaki, Kawasaki; Masahiko Tachikake, Higashihiroshima, all of (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 09/430,305

(22) Filed: Oct. 29, 1999

(30) Foreign Application Priority Data

Nov. 11, 1998 (JP) .................................. 10-320613

(51) Int. Cl.$^7$ ................................ G01B 5/14; G01B 7/14
(52) U.S. Cl. ............................................ 33/819; 33/831
(58) Field of Search ......................... 33/813, 814, 819, 33/820, 831, 702, 816

(56) References Cited

U.S. PATENT DOCUMENTS

| | | | |
|---|---|---|---|
| 3,484,942 | * | 12/1969 | Toubhans ................................ 33/816 |
| 3,758,956 | * | 9/1973 | Nakata ................................... 33/816 |
| 4,255,861 | * | 3/1981 | Nakata et al. .......................... 33/820 |
| 4,561,185 | * | 12/1985 | Sakata et al. .......................... 33/819 |
| 4,578,868 | * | 4/1986 | Sasaki et al. .......................... 33/819 |
| 4,738,030 | * | 4/1988 | Backlund et al. ...................... 33/702 |
| 5,433,016 | * | 7/1995 | Tachikake et al. ..................... 33/820 |
| 5,495,677 | * | 3/1996 | Tachikake et al. ..................... 33/819 |
| 5,829,155 | * | 11/1998 | Takahashi et al. ..................... 33/831 |

* cited by examiner

*Primary Examiner*—G. Bradley Bennett
(74) *Attorney, Agent, or Firm*—Oliff & Berridge, PLC

(57) ABSTRACT

A minimum value renewal holder (33) for renewing and displaying a detected value (D) detected by a displacement sensor (9) on a display (10) when a spindle is moving in an advancing direction relative to an anvil and for holding a displayed value on the display (10) when the spindle moves in a retracting direction relative to the anvil and a retraction amount thereof (D−Dm) is less than a set amount (α), and a minimum value hold releasing potion (34) for releasing minimum value hold status when the spindle moves in the retracting direction relative to the anvil and the retraction amount (D−Dm) is not less than the set amount (α) are provided. Accordingly, the displayed value can be kept even when the anvil backs unpreparedly.

2 Claims, 4 Drawing Sheets

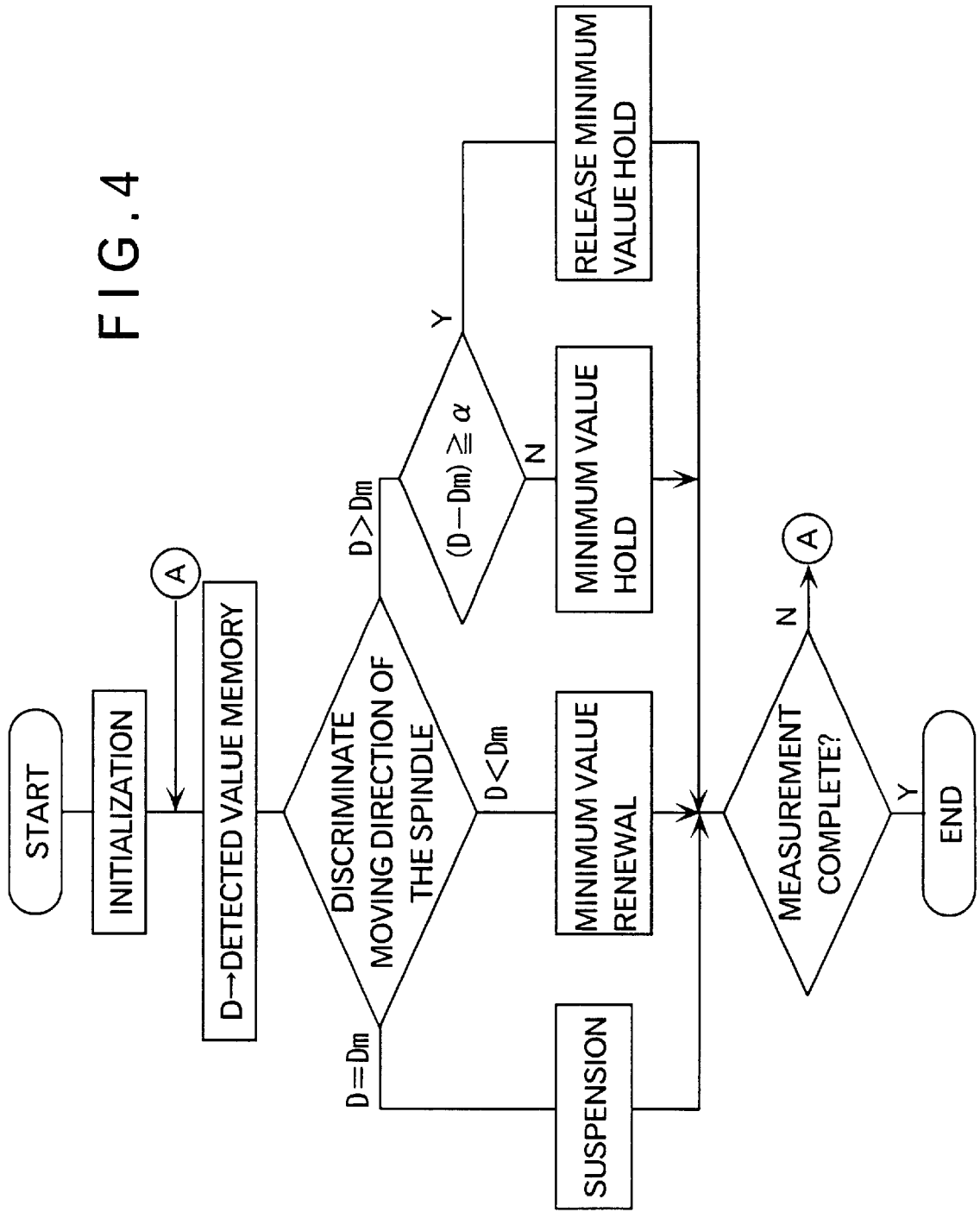

MICROMETER THAT HOLDS DISPLAYED DISPLACEMENT WHEN RETRACTION AMOUNT IS LESS THAN A SET AMOUNT

BACKGROUND OF THE INVENTION

1. Field of the Invention

The present invention relates to a micrometer. More specifically, it relates to a micrometer of which spindle moves at a high speed.

2. Description of the Related Art

Some micrometers move the spindle thereof at a higher speed than the conventional ones.

As shown in FIGS. 1 and 2, such micrometers include a frame 1 having an anvil 2, a spindle 3 advanceable relative to the anvil 2 of the frame 1, an inner sleeve 4 disposed on the frame 1 coaxially with the spindle 3, an outer sleeve 5 rotatably fitted to an outer circumference of the inner sleeve 4, a thimble 7 rotatably provided on an outside of the outer sleeve 5 through a ratchet mechanism 6, a driving means 8 for advancing and retracting the spindle 3 relative to the anvil 2 in accordance with rotation of the thimble 7, a displacement sensor 9 for detecting displacement amount of the spindle 3, and a display 10 for displaying detected value detected by the displacement sensor 9. Reference numeral 12 indicates a power on-off switch.

The driving means 8 includes an engage pin 21 projectingly provided on a rear end of the spindle 3 through a connecting member 20, a slit 22 formed on a circumference of the inner sleeve 4 along an axial direction of the spindle 3 for movably guiding the engage pin 21 in the axial direction of the spindle 3, and a spiral groove 23 formed in spiral on an inner circumference of the outer sleeve 5 around the center of the spindle 3 for engaging the engage pin 21. The pitch of the spiral groove 23 is extremely wider than a conventional screw pitch, which is, for example, approximately ten to twenty times as wide as the screw pitch of the conventional micrometer (ordinarily 0.5 mm pitch).

The displacement sensor 9 has a sensor 26 including a scale 24 formed along a longitudinal direction of the spindle 3 and a detector 25 fixed to the frame 1 spaced apart at a predetermined gap. The displacement sensor 9 converts signal detected by the sensor 26 into a number of pulse signals corresponding to a movement displacement amount of the spindle 3 and counts the pulses.

When the outer sleeve 5 is rotated by rotating the thimble 7, the spindle 3 is advanced and retracted in the axial direction thereof through an engage pin 21 engaging the spiral groove 23 of the outer sleeve 5. At this time, since the pitch of the spiral groove 23 is ten to twenty times as large as the conventional screw pitch, the spindle 3 can be moved approximately ten to twenty times as fast as the conventional one.

Accordingly, even in alternately measuring workpiece having dimension difference, the spindle 3 can be moved at a high speed, thereby efficiently conducting measurement.

According to the above-described high-speed micrometer, since the pitch of the spiral groove 23, i.e. a lead, is large, fluctuation of thrust force (thrust force: measurement force) of the spindle 3 according to deviation of driving force (force for rotating the thimble 7) can be restrained. On the other hand, when a user's hand is released from the thimble 7 while the workpiece is sandwiched by the anvil 2 and the spindle 3, the spindle 3 can be backed by the rotation of the outer sleeve 5. This is made possible since a larger rotating force operates on the outer sleeve 5 than the conventional micrometer by virtue of a counterforce provided by the workpiece.

When the spindle 3 is backed, the movement is detected by the displacement sensor 9, which result in a change of displayed value on the display 10.

SUMMARY OF THE INVENTION

An object of the present invention is to solve the above problem inherent to the conventional high-speed micrometer and to provide a micrometer capable of high-speed and highly accurate measurement even when the spindle is backed by the counterforce by the workpiece.

A micrometer according to the present invention has a frame including an anvil, a spindle advanceably provided relative to the anvil, a sleeve provided on an outside of the spindle on the frame rotatably around a central axis of the spindle, a driving means for advancing and retracting the spindle relative to the anvil in accordance with a rotation of the sleeve, a displacement sensor for detecting a displacement amount of the spindle, and a display for displaying detected value detected by the displacement sensor, the driving means including a spiral groove on either one of the sleeve or the spindle around a center of the spindle and an engage pin provided on the other one of the sleeve and the spindle for slidably engaging the spiral groove, and a lead of the spiral groove being not less than 5 mm. The micrometer is characterized in further comprising: a moving direction discriminator for discriminating a moving direction of the spindle; a minimum value renewal holder for newly displaying detected value detected by the displacement sensor when the moving direction discriminator judges that the spindle advances in an advancing direction relative to the anvil and also for holding displayed value on the display when the moving direction discriminator judges that the spindle moves in a retracting direction relative to the anvil and the retraction amount of the spindle from the displayed value newly displayed on the display is less than a set amount; and a minimum value hold releaser for displaying the detected value detected by the displacement sensor on the display when the moving direction discriminator judges that the spindle is moving in a retracting direction relative to the anvil and when the retraction amount of the spindle from the displayed value newly displayed on the display is not less than the set amount.

According to the above arrangement, the detected value detected by the displacement sensor is newly displayed onto the display when the spindle moves in the advancing direction relative to the anvil. In other words, when the spindle advances toward the anvil, the minimum value is automatically newly displayed.

During the measurement process, when the spindle moves in a retracting direction relative to the anvil, the retraction amount, i.e. retraction amount of the spindle from updated minimum value is within a range of the set amount, the displayed value on the display is held. In other words, the minimum value is maintained. Accordingly, when the spindle is backed by a rotation of the sleeve caused on account of large lead of the spiral groove, the displayed value is not changed, thereby achieving high-speed and highly accurate measurement.

On the other hand, when the retraction amount of the spindle is more than the set amount, the detected value detected by the displacement sensor is displayed on the display. In other words, the minimum hold status is released. Accordingly, the minimum hold status can be released in a series of ordinary measurement operation without accompanying special switching operation, thereby achieving superior operability.

In the above, a setting means for selectively setting the set amount may preferably be provided.

By providing the setting means, since the set amount can be selectively established, the minimum hold release condition can be changed according to measurement condition. Accordingly, since the minimum hold status is not released unpreparedly, the displayed value can be securely read.

BRIEF DESCRIPTION OF THE DRAWINGS

FIG. 4 is a flow chart showing a movement of the micrometer.

DETAILED DESCRIPTION OF PREFERRED EMBODIMENT(S)

An embodiment of the present invention will be described below with reference to attached drawings. Incidentally, since the basic mechanism of the micrometer is identical with the mechanism shown in FIG. 1 and 2, description therefor will be omitted.

Figure 3:
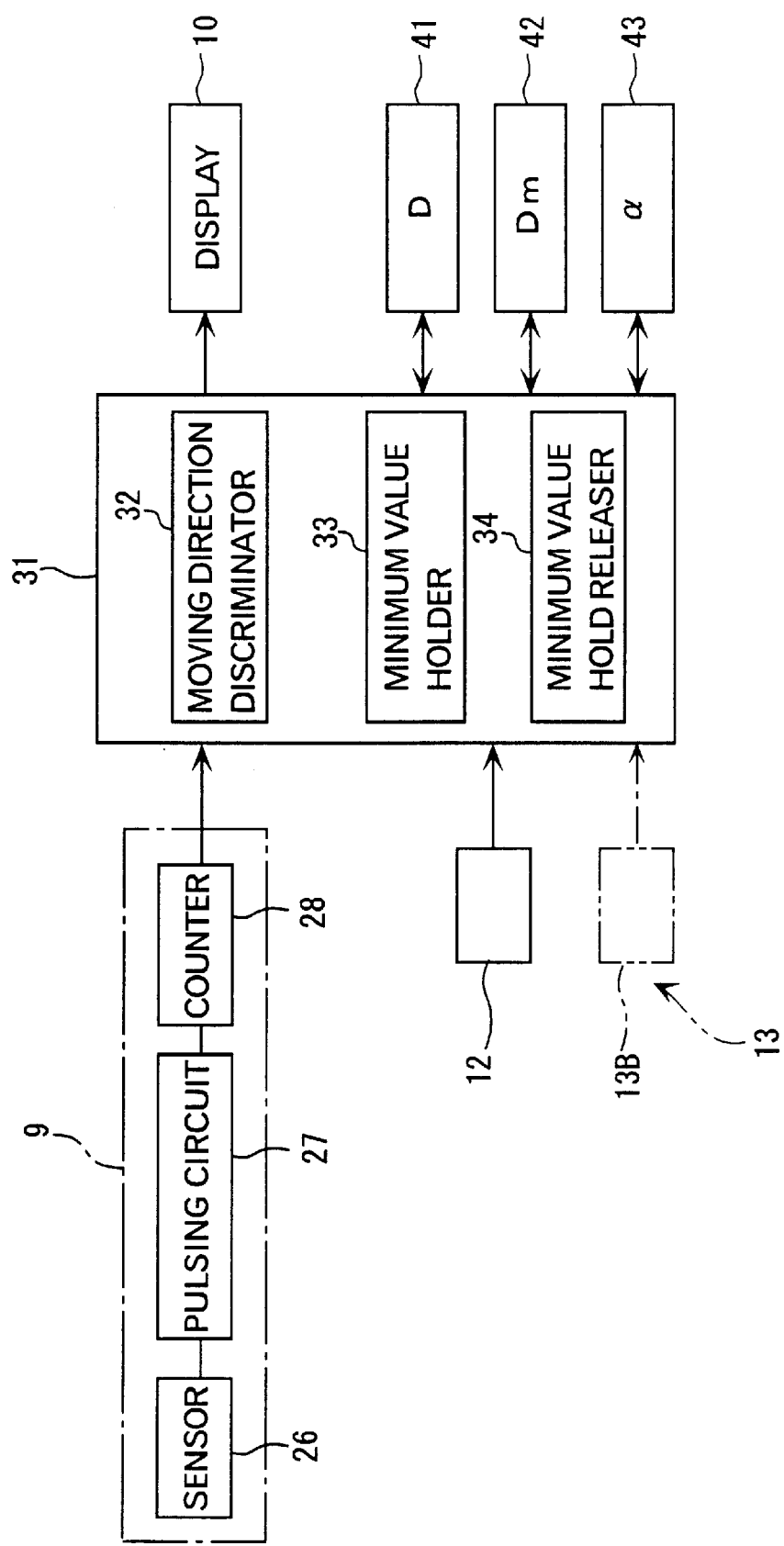
FIG. 3 is a block diagram showing the micrometer.

As shown in FIG. 3, the micrometer according to the present embodiment includes a moving direction discriminator 32 for discriminating moving direction of the spindle 3, a minimum value renewal holder 33 and a minimum value hold releaser 34 respectively added to a processor 31 for processing the detected value of the displacement sensor 9 to display onto the display 10.

Further, a detected value memory 41 for storing a detected value D fetched from the displacement sensor 9 for every predetermined time period, a minimum value memory 42 for renewing and storing a minimum value Dm of the detected value D, and a set amount memory 43 for storing in advance a set amount α defining release condition of minimum value hold status. Incidentally, the displacement sensor 9 includes the sensor 26, a pulsing circuit 27 for outputting the signal detected by the sensor 26 as a number of pulse signal corresponding to the movement displacement amount of the spindle 3 and a counter 28 for counting the pulses from the pulsing circuit 27.

The moving direction discriminator 32 discriminates the moving direction of the spindle 3 by a relationship between the detected value D of the detected value memory 41 and the minimum value Dm of the minimum value memory 42. In other words, when the newly fetched detected value D is smaller than the minimum value Dm, the moving direction discriminator 32 judges that the spindle 3 is moving in an advancing direction, and when the detected value D is larger than the minimum value Dm, the moving direction discriminator 32 judges that the spindle 3 is moving in a retracting direction. When the detected value D and the minimum value Dm is the same, the moving direction discriminator 32 judges that the spindle 3 is stopped.

When the moving direction discriminator 32 judges that the spindle 3 is moving in an advancing direction relative to the anvil 2, the minimum value renewal holder 33 newly displays the detected value D detected by the displacement sensor 9 onto the display 10. On the other hand, when the moving direction discriminator 32 judges that the spindle 3 is moving in a retracting direction relative to the anvil 2 and a retraction amount (retraction amount of the spindle 3 (D−Dm) from the minimum value Dm stored in the minimum value memory 42) is within the set amount α stored in the set amount memory 43, the minimum value renewal holder 33 holds the displayed value of the display 10.

The minimum value hold releaser 34 displays the detected value detected by the displacement sensor 9 when the moving direction discriminator 32 judges that the spindle 3 is moving in a retracting direction relative to the anvil 2 and the retraction amount of the spindle 3 (D−Dm) exceeds the set amount α.

Next, a function of the present embodiment will be described below with reference to flow chart of FIG. 4.

When the power is on, initial setting (store the detected value of the displacement sensor 9 into the detected value memory 41 and the minimum value memory 42) is conducted and, after the detected value D of the displacement sensor 9 is stored in the detected value memory 41, the moving direction of the spindle 3 is judged by the newly fetched detected value D of the detected value memory 41 and the minimum value Dm of the minimum value memory 42.

In other words, when the detected value D is smaller than the minimum value Dm (D<Dm), the moving direction discriminator 32 judges that the spindle 3 is moving in an advancing direction, and when the detected value D is larger than the minimum value Dm (D>Dm), the moving direction discriminator 32 judges that the spindle 3 is moving in a retracting direction.

When the detected value D and the minimum value Dm are equal (D=Dm), the moving direction discriminator 32 judges that the spindle is stopped.

When the spindle 3 is judged to be stopped (D=Dm), minimum value renewal step is conducted. Specifically, the detected value D in the detected value memory 41 is newly stored in the minimum value memory 42 and, after displaying the minimum value Dm in the minimum value memory 42 onto the display 10, detected value fetching step is re-conducted. Accordingly, when the spindle 3 is advanced toward the anvil 2, the detected value D from the displacement sensor 9 is newly stored in the minimum value memory 42 and is renewed and displayed onto the display 10. Accordingly, the minimum value is always displayed on the display 10.

When the spindle 3 is judged to be moving in the retracting direction (D>Dm), whether the retraction amount of the spindle 3 (D−Dm) exceeds the set amount α stored in the set amount memory 43 or not is checked.

When the retraction amount of the spindle 3 is less than the set amount α, the minimum value hold step is conducted. In other words, the displayed value on the display 10 is maintained in a held status (directly displaying the minimum value Dm of the minimum memory 42 without renewing). At this time, when the hand (finger) is released from the thimble 7, since the counterforce from the workpiece works on the spindle 3, the outer sleeve 5 is slightly rotated through the engage pin 21 and the spiral groove 23. In other words, the spindle 3 is backed to be remote from the anvil 2. However, even when the spindle 3 is backed to be remote from the anvil 2, the detected value by the displacement sensor 9 is not renewed, so that a value at a position where the spindle 3 most approaches the anvil 2 is kept on being displayed on the display 10. Accordingly, since the displayed value is not changed, highly accurate measurement is possible.

When the retraction amount (D−Dm) exceeds the set amount α, minimum value hold releasing step is conducted. Specifically, the detected value of the detected value memory 41 is written on the minimum value memory 42 as the minimum value Dm and is displayed onto the display 10. Accordingly, when the spindle 3 is retracted to be remote from the anvil 2 after the displayed value on the display 10 is read, the minimum value hold status is automatically released when the retraction amount (D−Dm) reaches the predetermined set amount α.

Ordinarily, since the spindle 3 is once retracted after completion of measurement for shifting to the next measurement and the minimum value hold status is automatically released in accordance with the retraction process, the minimum value hold status can be released by ordinary measurement process without conducting special releasing operation.

Therefore, according to the present embodiment, the minimum value is always displayed on the display 10 when the spindle 3 is moving in the advancing direction. When the spindle 3 moves in the retracting direction, since the displayed value (minimum value) on the display 10 is kept in the hold status where the retraction amount of the spindle 3 from the minimum value Dm (D−Dm) is less than the set amount α, the displayed value is not shifted even when the spindle 3 is backed by the rotation of the outer sleeve 5 caused on account of large lead of the spiral groove 23. Accordingly, high-speed and highly accurate measurement can be conducted. Further, accurate measurement is possible even when the measurement is conducted while doing probing work.

Further, when the retraction amount (D−Dm) of the spindle 3 exceeds the set amount α, the minimum value hold status is automatically released and the detected value detected by the displacement sensor 9 is displayed on the display 10. Accordingly, since the minimum value hold status can be released in an ordinary series of measurement process without employing special switching operation, operability thereof can be enhanced.

Incidentally, though the lead of the spiral groove 23 constituting the driving means 8 is approximately ten to twenty times (5–10 mm) as wide as the lead of the conventional micrometer (ordinarily 0.5 mm) in the aforesaid embodiment, the above-described problem (the outer sleeve 6 is rotated by the counterforce of the workpiece to retract the spindle 3) is possible when the lead of the spiral groove is not less than 5 mm. Accordingly, the present invention can be suitably applied to a high-speed micrometer having a lead of spiral groove of not less than 5 mm.

Further, a setting means 13 for selectively setting the set amount α may preferably be provided.

Figure 1:
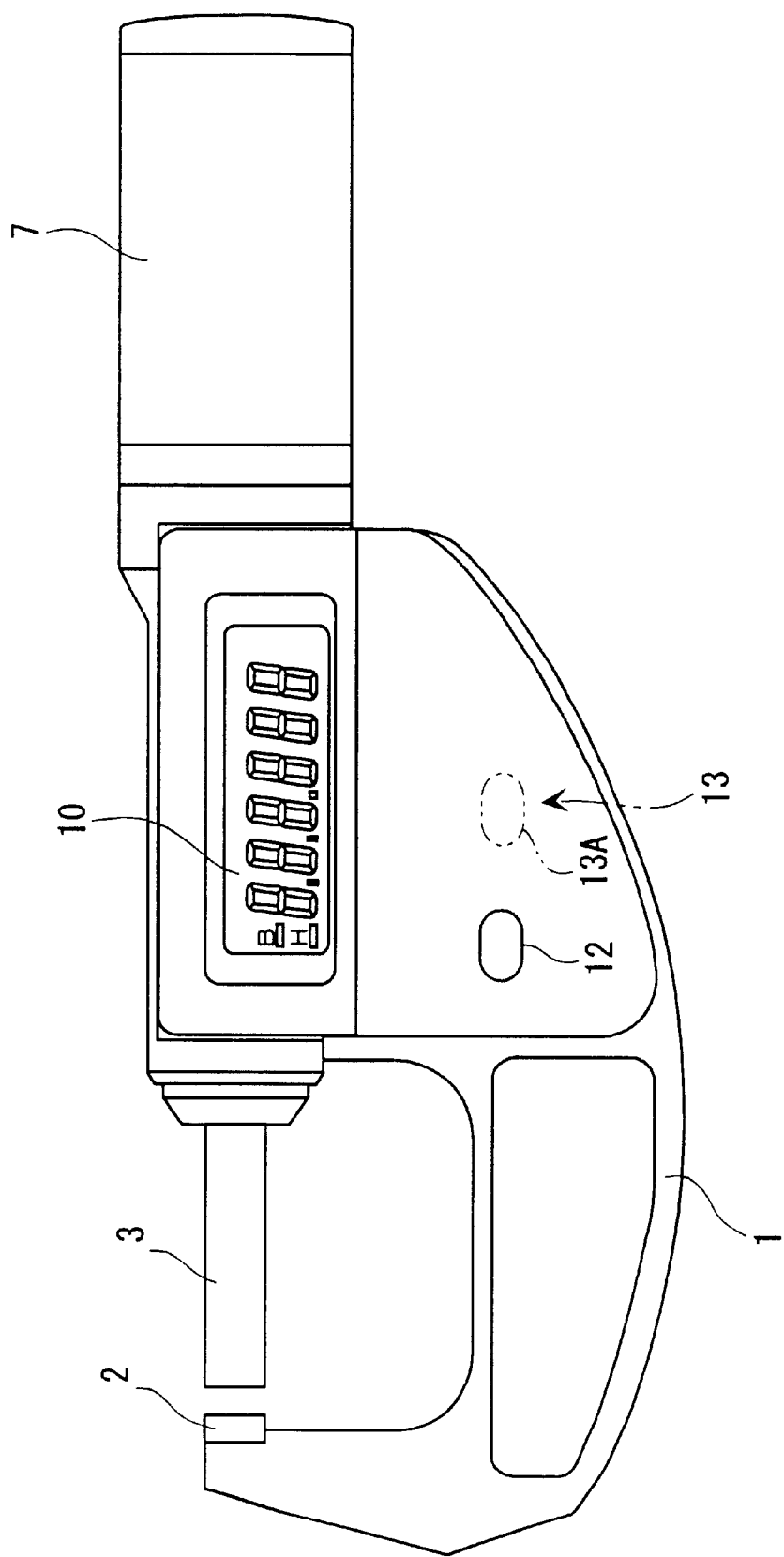
FIG. 1 is a front elevation showing a micrometer.
Figure 2:
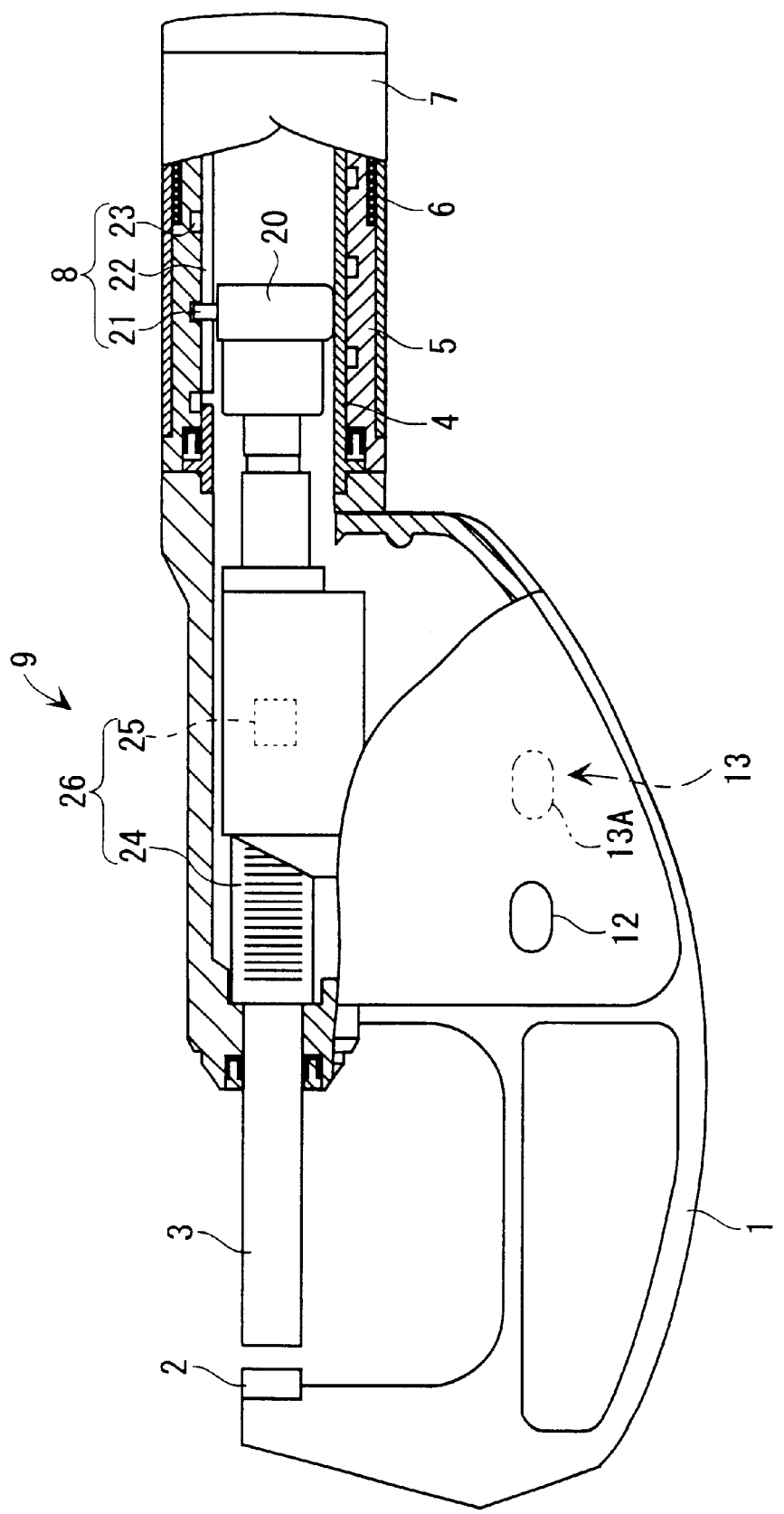
FIG. 2 is a cross section showing the micrometer.

The setting means may include a setting button 13A shown in double dotted line in FIG. 1 and 2 and a setting circuit 13B (shown in double-dotted line in FIG. 3) for changing the value of the set amount α held in the processor 31 when the setting button 13A is pushed.

The setting circuit 13B may be designed based on existing electronic technique. For instance, the set amount α may be increased and decreased by a predetermined amount every time the setting button 13A is pushed, or alternatively, the increase and decrease amount of the set amount α may be widened or time period for increase and decrease may be shortened when the button is continuously pushed for a predetermined time. Or, for increasing and decreasing the set amount α by one setting button 13A, the function of the setting button 13A may be switched like "increase" when the setting button 13A is continuously pushed and "decrease" when the setting button 13A is continuously pushed after one short push. Further alternatively, increase and decrease direction may be changed by continuously pushing the button. In the above, the increase and decrease direction may be indicated on the display 10 with signs of "+" and "−".

The set amount α can be selectively established by providing the setting means 13 to change the minimum value hold releasing condition. Accordingly, the minimum value hold status is not released unpreparedly, thereby securely reading the displayed value.

Further, though the engage pin 21 is projectingly provided on the spindle 3 and the spiral groove 23 is formed on the outer sleeve 5 in the aforesaid embodiment, reverse arrangement is possible. In other words, the spiral groove may be formed on the outer circumference of the spindle 3 and the engage pin may be projectingly provided on the outer sleeve 5. In this arrangement, since the spindle 3 rotatingly advances and retracts, a rotary encoder etc. may be used as the displacement sensor.

What is claimed is:

1. A micrometer having a frame including an anvil, a spindle advanceably provided relative to the anvil, a sleeve provided on an outside of the spindle on the frame rotatably around a central axis of the spindle, a driving means for advancing and retracting the spindle relative to the anvil in accordance with a rotation of the sleeve, a displacement sensor for detecting a displacement amount of the spindle, and a display for displaying detected value detected by the displacement sensor, the driving means including a spiral groove on either one of the sleeve or the spindle around a center of the spindle and an engage pin provided on the other one of the sleeve and the spindle for slidably engaging the spiral groove, wherein a lead of the spiral groove is not less than 5 mm, the micrometer further comprising:

a moving direction discriminator for discriminating a moving direction of the spindle;

a minimum value renewal holder for newly displaying detected value detected by the displacement sensor when the moving direction discriminator judges that the spindle advances in an advancing direction relative to the anvil and also for holding displayed value on the display when the moving direction discriminator judges that the spindle moves in a retracting direction relative to the anvil and the retraction amount of the spindle from the displayed value newly displayed on the display is less than a set amount; and a minimum value hold releaser for displaying the detected value detected by the displacement sensor on the display when the moving direction discriminator judges that the spindle is moving in a retracting direction relative to the anvil and when the retraction amount of the spindle from the displayed value newly displayed on the display is not less than the set amount.

2. The micrometer according to claim 1, further comprising a setting means for selectively setting the set amount.

* * * * *